United States Patent [19]

Vaughn et al.

[11] Patent Number: 5,423,414
[45] Date of Patent: Jun. 13, 1995

[54] EVAPORATIVE POUCH COOLER

[75] Inventors: Rex Vaughn, Flint; Leonard Wallace, Fenton, both of Mich.

[73] Assignee: I & H Conveying & Machine Co., Inc., Grand Blanc, Mich.

[21] Appl. No.: 183,317

[22] Filed: Jan. 19, 1994

[51] Int. Cl.⁶ .............................................. B65G 37/00
[52] U.S. Cl. .................................................. 198/603
[58] Field of Search ......................... 198/603, 952, 408

[56] References Cited

U.S. PATENT DOCUMENTS

| | | | |
|---|---|---|---|
| 1,457,352 | 6/1923 | Dreher | 198/603 X |
| 1,578,617 | 3/1926 | Van Houten | 198/603 |
| 2,709,412 | 5/1955 | Eagerman | 198/603 X |
| 2,923,138 | 2/1960 | Rollins | 198/603 X |
| 2,993,582 | 7/1961 | Souser | 198/603 X |
| 3,863,912 | 2/1975 | Korff | 271/245 |
| 4,309,938 | 1/1982 | Harmon | 198/603 X |
| 4,425,995 | 1/1984 | Blatterman et al. | 198/605 |

FOREIGN PATENT DOCUMENTS

| | | | |
|---|---|---|---|
| 0556752 | 4/1958 | Canada | 198/603 |
| 0830237 | 7/1938 | France | 198/603 |

OTHER PUBLICATIONS

Garroutte, "Water Cooling Waterfall Hydrochiller" (acknowledged to be prior art by Applicant).

Primary Examiner—James R. Bidwell
Attorney, Agent, or Firm—Young, MacFarlane & Wood

[57] ABSTRACT

An evaporative cooler for pouches containing a liquid or semi-liquid material such as tomato paste. The cooler includes a housing, a plurality of generally horizontal endless conveyor assemblies arranged one above the other within the housing in vertically spaced relation and each including an endless conveyor member trained over feed and discharge pulleys at the feed and discharge ends of the conveyor assembly. The upper runs of the conveyor assemblies are driven in successively opposite longitudinal directions within the housing so that a pouch may be deposited on the feed end of the uppermost conveyor assembly, move in one longitudinal direction along the upper run of the uppermost conveyor assembly to the discharge end of the uppermost conveyor assembly for discharge onto the feed end of a lower conveyor assembly, thereafter move in an opposite longitudinal direction along the upper run of the next lower conveyor assembly to the discharge end of the lower conveyor assembly for discharge onto the feed end of a yet lower conveyor assembly and proceed in this manner progressively along all of the conveyor assemblies until discharged from the discharge end of the lowermost conveyor assembly.

22 Claims, 5 Drawing Sheets

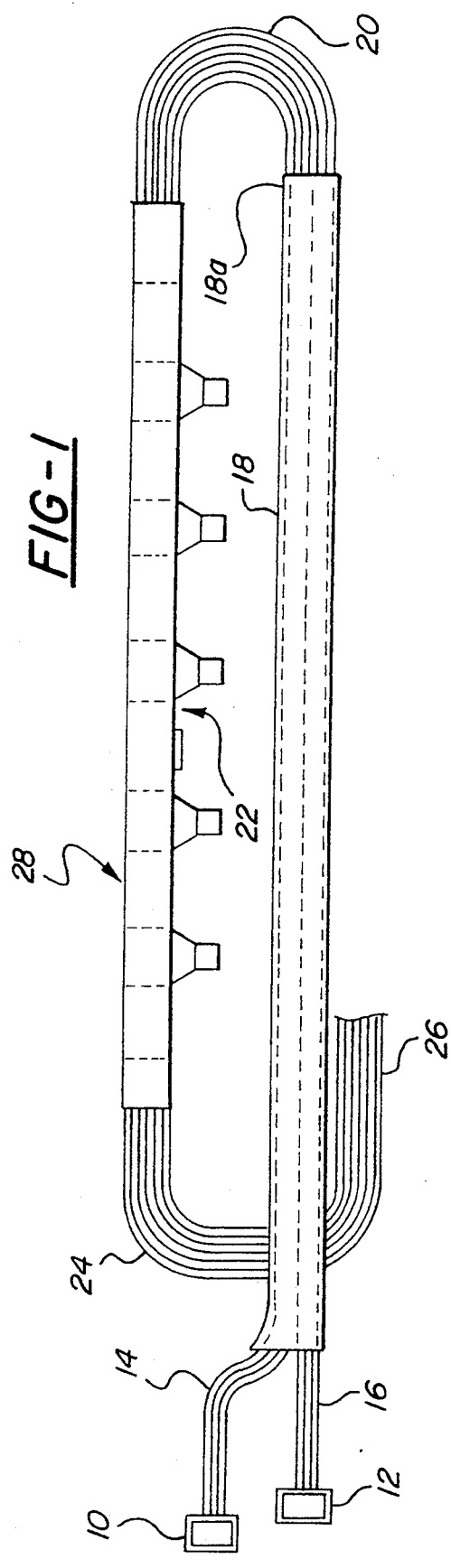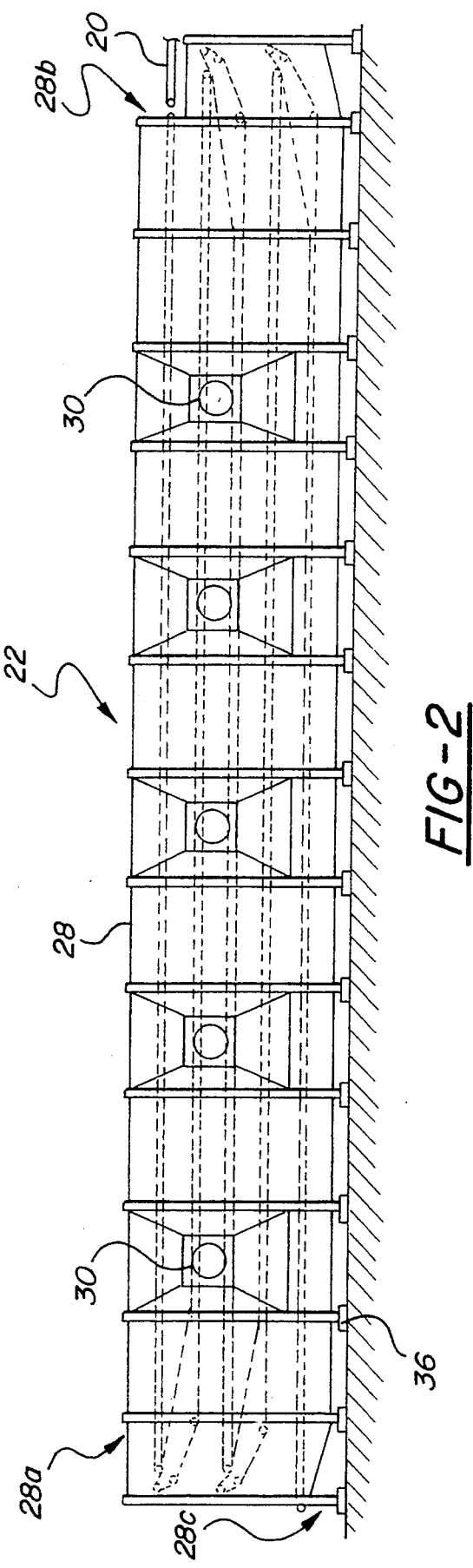

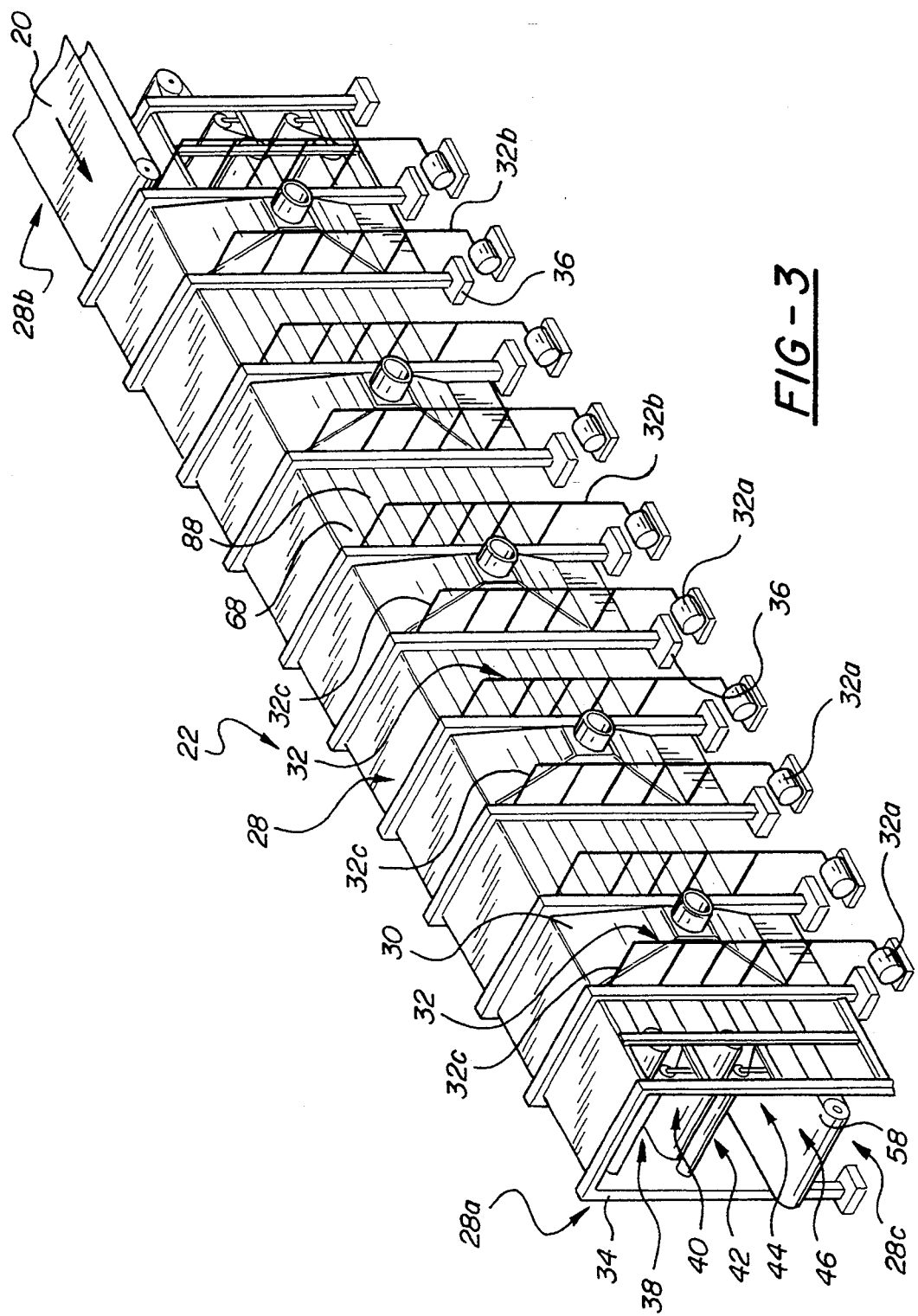

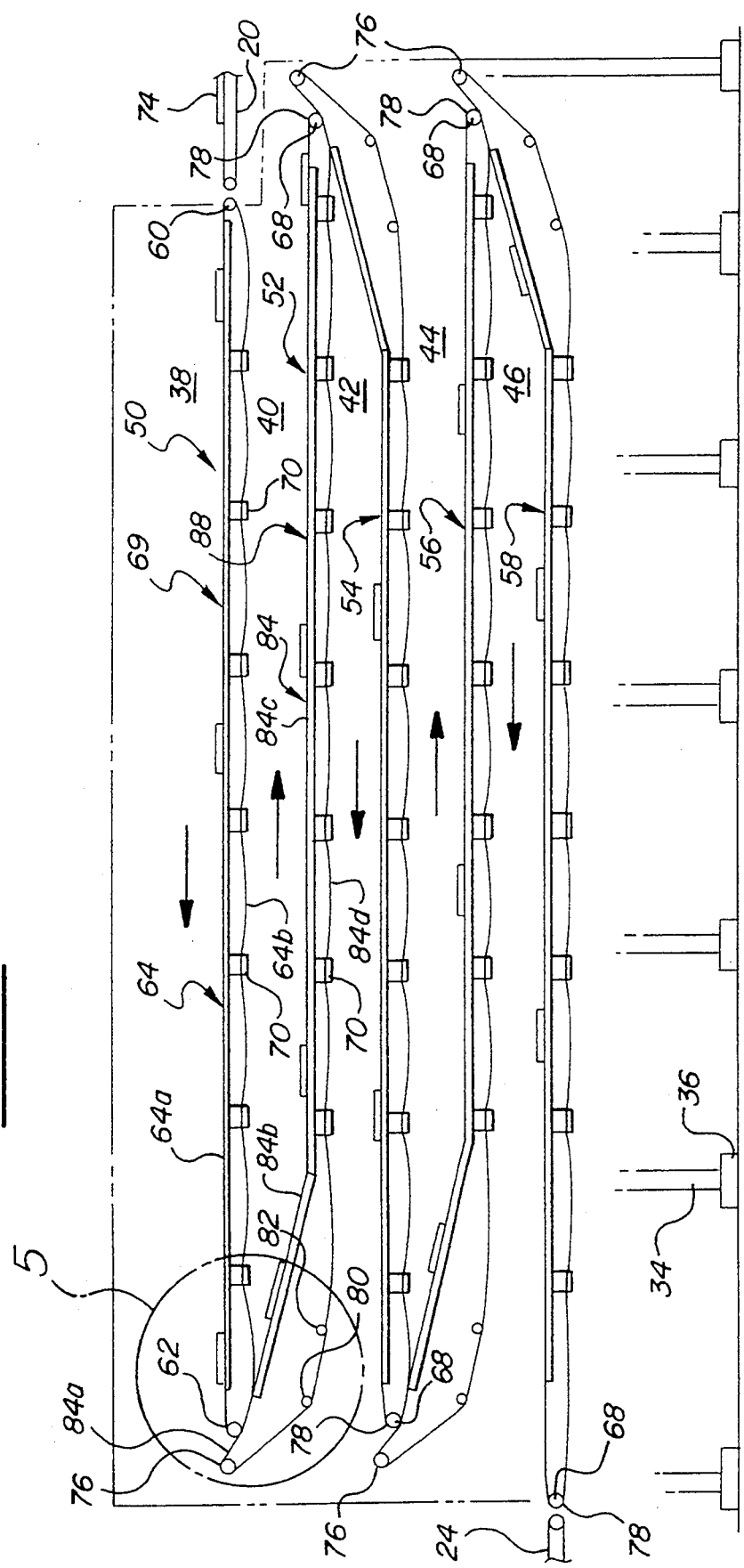

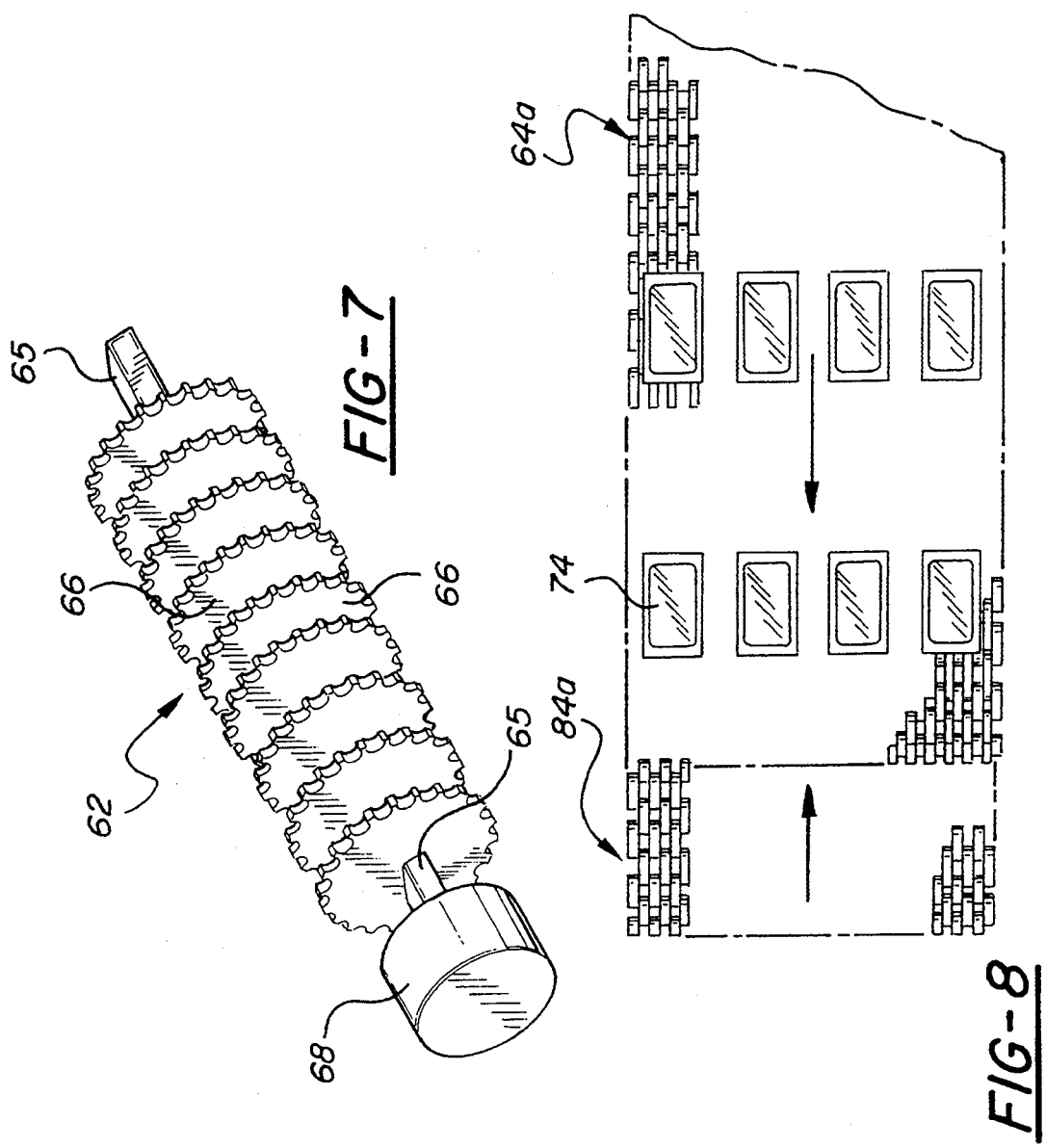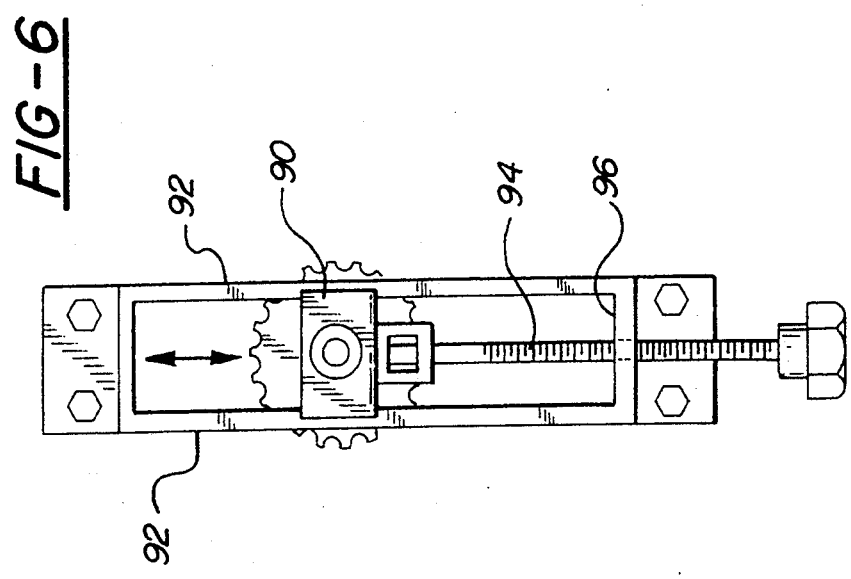

EVAPORATIVE POUCH COOLER

BACKGROUND OF THE INVENTION

This invention relates to evaporative coolers and more particularly to evaporative coolers specially adapted to cool pouches containing liquid or semi-liquid materials such as tomato paste or the like.

Pouches of tomato paste are typically subjected to a heating process to perform a biological kill on the material to preserve the product. After the biological kill has been performed it is important that the heat be quickly removed from the product so that the heat does not overcook or burn the product.

In one popular form of prior art cooler, the pouches are routed through a series of conveyor assemblies positioned one above the other. As the pouches move across the conveyors they are sprayed with water and a high volume flow of air is drawn into one side of the conveyor housing and discharged from the other side of the housing. The combination of the spray and the air flow across the pouches causes an evaporative cooling effect.

Typically the pouches comprise a flexible plastic pouch and the pouches are loaded into the end of the uppermost conveyor of the conveyor system whereafter the pouches travel along the upper conveyor where they are sprayed with water in the moving airstream. When the pouches reach the end of the conveyor they are discharged downwardly from the discharge end of the upper conveyor onto the feed end of the next lower conveyor for subsequent movement through the cooler. It is important that the transfer of the pouches from the discharge end of the upper conveyor and the feed end of the next lower conveyor be carefully controlled so as not to ball up the pouches or rupture the pouches in the transfer process. Various arrangements have been proposed in the prior art to facilitate this transfer.

According to one prior art transfer proposal, the pouches are directed to the next lower conveyor through a slide mechanism wherein, when the pouches reach the end of the upper conveyor, they drop off the discharge end of the upper conveyor and are directed onto an inclined slide which serves to direct the pouch to the feed end of the next lower conveyor. This arrangement has a number of disadvantages. First, the orientation of the pouches changes when they hit the slide and again when they arrive at the end of the slide and hit the next lower conveyor. Because the bags are flexible they tend to twist, puff or otherwise distort during the transfer from one conveyor to the next. Additionally, the pouches tend to bunch up on the slide, striking the pouches ahead of them and destroying the separation between the pouches and thereby reducing the effectiveness of the cooling function. Further, effective cooling is best achieved by keeping the pouches in a flat configuration and the transfer of the pouches between conveyors using the slide mechanism has the effect of balling up the pouches so that they are no longer flat and so that the cooling effect is lessened. Further, the pouches tend to assume a random orientation on the slide and tend to slide toward the center or side of the conveyor unit where they may catch or strike on the sides of the conveyor. Although rupture of the pouches is rare, it is generally preferable to keep the pouches under positive control, well separated and correctly oriented as a method of eliminating any chance of pouch rupture.

According to a second prior art proposal for transferring the pouches from one conveyor level to the next, a separate transfer conveyor mechanism is provided proximate the discharge end of the upper conveyor. In this arrangement, the separate transfer conveyor mechanism coacts with the discharge pulley of the upper conveyor to move the pouches around the discharge pulley and deposit them on the feed end of the next lower conveyor. While this arrangement represents an improvement over the slide mechanism, it also has a number of disadvantages. First, it represents a separate piece of machinery which requires either power take-off from the main conveyor or its own power source. Additionally, it is complicated, requiring, for example, its own set of rollers, drive motors, gears, tension pulleys, etc. Further, there is inherently a gap between the main upper conveyor of the evaporative cooler and the transfer conveyor mechanism and this gap may cause misalignment of the pouches, snagging of the pouches, or contamination of the pouches with debris.

SUMMARY OF THE INVENTION

This invention is directed to the provision of an improved transfer methodology for handling pouches.

This invention is further directed to the provision of an improved evaporative cooler for pouches.

More specifically, this invention is directed to the provision of an improved evaporative cooler of the stacked conveyor type in which the transfer of the pouches from upper to lower conveyors is positively controlled.

The invention transfer methodology relates to a method of conveying articles such as pouches through a treatment facility in which the articles are moved back and forth and gradually downwardly within the facility by a plurality of endless conveyor assemblies arranged one above the other within the facility in vertically spaced relation and each including an endless conveyor member trained over feed and discharge pulleys at the feed and discharge ends of the conveyor assembly so that the articles may be moved along the upper run of the upper conveyor assembly in one longitudinal direction and thereafter be transferred from the discharge end of the upper conveyor assembly to the feed end of the lower conveyor assembly for movement along the upper run of the lower conveyor assembly in the opposite longitudinal direction.

According to the invention methodology, the articles are transferred between the discharge end of the upper conveyor assembly and the feed end of the lower conveyor assembly by passing them between the upper run of the lower conveyor assembly and the discharge pulley of the upper conveyor assembly with one surface of each article engaged by the endless conveyor member of the upper conveyor assembly as it passes around the discharge pulley of the upper conveyor assembly and the other surface of the article engaged by the endless conveyor member of the lower conveyor assembly as it passes beneath the discharge pulley of the upper conveyor assembly. This methodology ensures that the articles are firmly and positively controlled as they move between the discharge end of the upper conveyor assembly and the feed end of the lower conveyor assembly.

According to a further aspect of the invention methodology, the upper run of the lower conveyor assembly leaving the feed pulley of the lower conveyor assembly is trained around a portion of the circumference of the discharge pulley of the upper conveyor assembly so that it may coact with the discharge pulley over the circumferential portion of the discharge pulley to engage the articles therebetween. This specific methodology ensures a large area of gripping and coaction as between the upper and lower conveyors as the articles are transferred between the upper and lower conveyors.

According to a further feature of the invention methodology, slack is provided in the endless conveyor member of the lower conveyor assembly so that it may move away from the discharge pulley of the upper conveyor assembly in response to arrival of an article at the convergence of the upper run of the lower conveyor assembly and the discharge pulley of the upper conveyor assembly.

The invention evaporative cooler is of the type including a housing, a plurality of generally horizontal endless conveyor assemblies arranged one above the other within the housing in vertically spaced relation and each including an endless conveyor member trained over feed and discharge pulleys at the feed and discharge ends of the conveyor assembly, and means driving the upper runs of the conveyor assemblies in successively opposite longitudinal directions within the housing so that a pouch may be deposited on the feed end of the uppermost conveyor assembly, move in one longitudinal direction along the upper run of the uppermost conveyor assembly to the discharge end of the uppermost conveyor assembly for discharge onto the feed end of the lower conveyor assembly, thereafter move in an opposite longitudinal direction along the upper run of the lower conveyor assembly to the discharge end of the lower conveyor assembly for discharge onto the feed end of a yet lower conveyor assembly and proceed in this manner successively along all of the successively lower conveyor assemblies until discharged from the discharge end of the lowermost conveyor assembly.

According to the invention, and with respect to each discharge end of an upper conveyor assembly coacting with a feed end of a lower conveyor assembly, the feed pulley of the lower conveyor assembly is elevated with respect to the discharge pulley of the lower conveyor assembly and is positioned longitudinally beyond the discharge pulley of the upper conveyor assembly, and the upper run of the lower conveyor assembly leaving the feed pulley of the lower conveyor assembly passes downwardly at an angle in proximity to the discharge pulley of the upper conveyor assembly to a location below the discharge pulley of the upper conveyor assembly so that pouches leaving the discharge end of the upper conveyor assembly pass between the discharge pulley of the upper conveyor assembly and the upper run of the lower conveyor assembly and are engaged at their respective upper and lower surfaces by the endless conveyor member of the upper conveyor assembly as it passes around the discharge pulley of the upper conveyor assembly and the endless conveyor member of the lower conveyor assembly as it passes beneath the discharge pulley of the upper conveyor assembly. This arrangement provides firm, positive control of the pouches as they are transferred between the upper conveyor assembly and the lower conveyor assembly and also provides stimulation of the contents of the pouches so as to improve the cooling action.

According to a further feature of the invention evaporative cooler, the upper run of the lower conveyor assembly passes downwardly at a relatively sharp angle as it leaves the feed pulley of the lower conveyor assembly, thereafter trains over a portion of the circumference of the discharge pulley of the upper conveyor assembly, thereafter moves downwardly at a relatively shallow angle, and thereafter moves through a generally horizontal path to the discharge pulley of the lower conveyor assembly, and the endless conveyor member of the lower conveyor assembly has sufficient slack to allow it to move away from the discharge pulley of the upper conveyor assembly in response to arrival of a pouch at the juncture of the upper run of the lower conveyor assembly and the discharge pulley of the upper conveyor assembly so as to allow the pouch to pass between the discharge pulley of the upper conveyor assembly and the upper run of the lower conveyor assembly.

According to a further feature of the invention evaporative cooler, the lower run of the upper conveyor assembly as it leaves the discharge pulley of the upper conveyor assembly moves upwardly to augment the divergence of the lower run of the upper conveyor assembly and the upper run of the lower conveyor assembly as the endless conveyor members leave the discharge pulley of the upper conveyor assembly.

According to a further feature of the invention evaporative cooler, the cooler further includes means operative to selectively move the feed pulley of the lower conveyor assembly vertically so as to selectively adjust the vertical position of the feed pulley of the lower conveyor assembly relative to the discharge pulley of the upper conveyor assembly and thereby selectively vary the extent to which the upper run of the lower conveyor assembly trains around the lower side of the discharge pulley of the upper conveyor assembly.

According to a further feature of the invention evaporative cooler, the highest point on the feed pulley of the lower conveyor assembly is at least as high as the center of rotation of the discharge pulley of the upper conveyor assembly. In the disclosed embodiment of the invention, the center of rotation of the feed pulley of the lower conveyor assembly is higher than the center of rotation of the discharge pulley of the upper conveyor assembly.

According to a further feature of the invention evaporative cooler, the housing includes support means underlying the conveyor member of the lower conveyor assembly as it moves downwardly along the relatively shallow angle portion of the upper run, and the support means begins at a location along the shallow angle portion of the upper run spaced from the discharge pulley of the upper conveyor assembly so that the conveyor member of the lower conveyor assembly moves through a region between the discharge pulley of the upper conveyor assembly and the beginning of the support member where it is unsupported, whereby to facilitate the movement of the endless conveyor member of the lower conveyor assembly away from the discharge pulley of the upper conveyor assembly in response to the arrival of a pouch.

BRIEF DESCRIPTION OF THE DRAWINGS

FIG. 1 is a schematic plan view of a pouch filling and cooling system embodying the invention evaporative cooler;

FIG. 2 is a schematic side elevational view of the invention evaporative cooler;

FIG. 3 is a perspective view of the invention evaporative cooler;

FIG. 4 is a cross-sectional view of the invention evaporative cooler;

FIG. 6 is a detail view showing the manner in which the feed pulley of a conveyor assembly may be adjusted;

FIG. 7 is a perspective view of a pulley assembly utilized in the invention evaporative cooler; and FIG. 8 is a detail fragmentary plan view showing the movement of pouches through the invention evaporative cooler.

DETAILED DESCRIPTION OF THE PREFERRED EMBODIMENT

Figure 5:
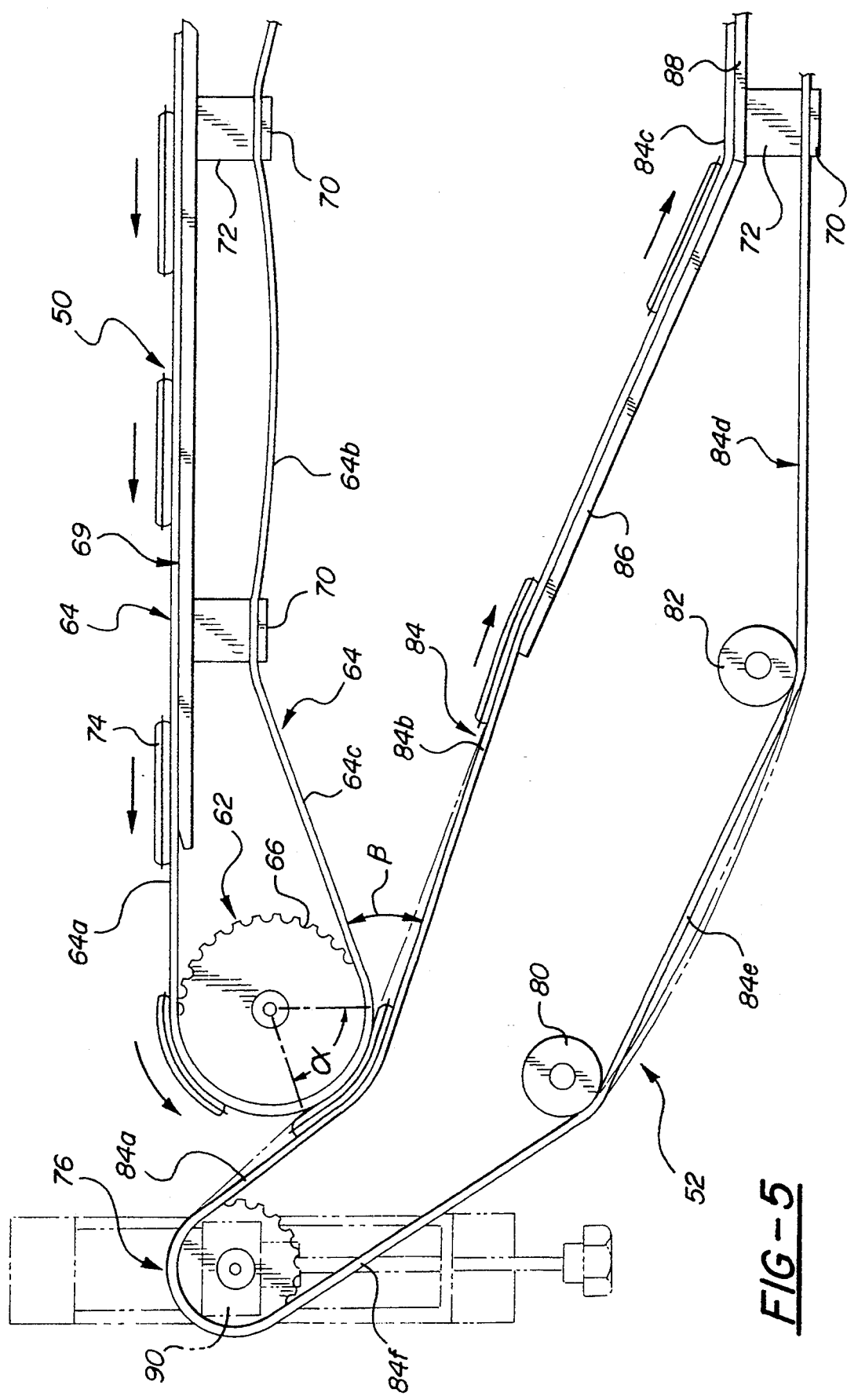
FIG. 5 is a detail view taken within circle 5 of FIG. 4.

The invention evaporative cooler is seen in FIG. 1 in association with a total system for filling and cooling pouches containing liquid or semi-liquid bulk material such as tomato paste. In the system of FIG. 1 the pouches are filled at stations 10 and 12 and are conveyed by respective conveyors 14 and 16 to the entry of a hot hold tunnel 18 where the conveyors combine to form a single conveyor assembly moving through the hot hold tunnel. The hot hold tunnel is inclined upwardly and terminates at an elevated upper end 18a. The combined conveyors exit from the elevated discharge end 18a of the hot hold tunnel and move through a U-shaped conveyor 20 for entry into evaporative cooler 22 at an elevated location. After passing through the evaporative cooler 22, they exit the evaporative cooler by a low level conveyor 24. Conveyor 24 has a U-configuration and passes beneath the lower end of the hot hold tunnel to deliver the pouches to a further conveyor 26 for further processing.

The invention evaporative cooler 22 includes a housing structure 28, a plurality of suction fans 30, a plurality of water supply assemblies 32, and a plurality of conveyor assemblies.

Housing structure 28 has a generally rectangular configuration and includes a forward end 28a and a rearward end 28b. Housing structure 28 includes a plurality of vertical frame members 34 terminating in feet 36 and coacting with horizontal frame members to define five vertically stacked layers or tiers, 38, 40, 42, 44 and 46. Suction fans 30 are positioned along one side of the frame structure 28 at longitudinally spaced locations and function to draw cooling air through louvers at the other side of the frame structure for movement across the housing structure.

Water assemblies 32 are positioned proximate the suction fans 30 and each includes a pump 32a, a standpipe 32b, and a plurality of nozzles 32c operative to spray water into the five tiers 38, 40, 42, 44 and 46 of the housing structure.

The cooler includes five conveyor assemblies with a first conveyor assembly 50 positioned in upper tier 38, a second conveyor assembly 52 positioned in tier 40, a third conveyor assembly 54 positioned in tier 42, a fourth conveyor assembly 56 positioned in tier 44, and a fifth conveyor assembly 58 positioned in tier 46.

Conveyor assembly 50 includes a feed end pulley 60, a discharge end pulley 62, and an endless conveyor member 64 trained around pulley 60 and 62. Endless conveyor member 64, as well as all of the endless conveyor members of the conveyor assemblies 50, 52, 54, 56 and 58, comprises a flexible mat of plastic links, and pulley 60 and 62, as well as all of the pulleys utilized in the conveyor assemblies 50, 52, 54, 56 and 58, comprise (FIG. 7) a square shaft 65 driving a plurality of laterally spaced toothed sprockets 66 which meshingly engage the flexible mat construction of the associated endless conveyor member in known fashion. Discharge pulley 62 is driven by a motor 68 and feed pulley 60 comprises an idler pulley. The upper run 64a of the endless conveyor member 64 moves over and is supported by a floor structure 69 defined by frame structure 28 and forming the lower boundary of upper tier 38. The lower run 64b of the endless conveyor member 64 is supported by and passes over a successive series of lateral slats 70 supported by brackets 72 depending from floor 68. Slats 70 are at a level substantially above the level of the lower periphery of discharge pulley 62 so that endless member 64 moves upwardly, through a lower run portion 64c, at a substantial angle as it leaves pulley 62.

Conveyor assemblies 52, 54, 56 and 58 are substantially identical in construction and are disposed in the housing structure in successively reversed disposition so that conveyor assemblies 52 and 56 occupy the same disposition within the housing structure and conveyor assembly 54 and 58 occupy the same disposition within the housing structure.

In overview, pouches 74 arriving on upper level conveyor 20 are transferred to the feed end of conveyor assembly 50 whereafter they move forwardly within the housing structure to the discharge end of the conveyor assembly 50 for discharge onto the feed end of the conveyor assembly 52 whereafter they move rearwardly within the housing structure to the discharge end of the conveyor assembly 52 where they are transferred to the feed end of the conveyor assembly 54 whereafter they move forwardly on conveyor assembly 54 to the discharge end of conveyor assembly 54 where they are transferred to the feed end of the conveyor assembly 56 whereafter they move rearwardly within the housing structure to the discharge end of the conveyor assembly 56 whereafter they are transferred to the feed end of conveyor assembly 58 whereafter they move forwardly within the housing structure to the discharge end of the conveyor 58 where they are discharged onto lower level conveyor 24. As the pouches move along the upper run of each conveyor assembly, they are sprayed and wetted by nozzles 32c and cooled by the evaporative effect created by the movement of air across the wetted pouches under the influence of suction fans 30.

Conveyor assembly 52 includes an idler feed pulley 76, a discharge pulley 78 driven by a motor 68, guide rollers 80 and 82, and an endless conveyor member 84. The feed pulley 76 of the lower conveyor assembly 52 is elevated with respect to the discharge pulley 62 of the upper conveyor assembly 50 and is positioned longitudinally beyond the discharge pulley of the upper conveyor assembly. Specifically, the center of rotation of the feed pulley 76 of the lower conveyor assembly 52 is higher than the center of rotation of the discharge pulley 62 of the upper conveyor assembly.

The upper run of the endless conveyor member 84 passes downwardly at a relatively sharp angle as it leaves feed pulley 76 through an upper run portion 84a, thereafter trains over and around a portion a of the circumference of the discharge pulley 62, thereafter moves downwardly at a relatively shallow angle through a further upper run portion 84b, and thereafter moves through a generally horizontal upper run portion 84c to the discharge pulley 78 of the lower conveyor assembly. Specifically, upper run shallow angle portion 84b, after leaving discharge pulley 62, moves over a downwardly angled apron or strake structure 86 provided as a part of the housing structure whereafter the upper run horizontal portion 84c moves over a floor 88 defined by the housing structure to the discharge pulley 78. The downward angle of lower run portion 84b of endless conveyor member 84 when combined with the upward angle of lower run portion 64c of endless conveyor member 64 produces a large angle of divergence $\beta$ between endless conveyor member 64 and 84 as they leave discharge pulley 62.

The lower run 84d of the endless conveyor member is guided by a series of longitudinally spaced, laterally extending slats 70 supported by brackets 72 extending downwardly from the floor 88. As the lower run 84d approaches the forward end 28a of the housing structure it passes around guide roller 82, moves upwardly through a lower run portion 84e, passes around guide roller 80, and thereafter moves upwardly through a lower run portion 84f for passage around idler feed pulley 76 and entry upon the initial steep angle portion 84a of the upper run.

Idler feed pulley 76 is mounted on a carriage 90 (FIG. 6) which is mounted for vertical sliding movement on a pair of parallel spaced track members 92 supported by housing structure 28. A vertically arrayed bolt 94 passes threadably through a threaded bore in a plate 96 and is attached at its upper end to the carriage 90 so that rotation of the bolt 94 has the effect of raising or lowering the carriage 90, and thereby the idler pulley 76, relative to the discharge pulley 62 of the upper conveyor assembly to thereby vary the circumferential extent $\alpha$ of the wrap of the upper run of the endless conveyor member of the lower conveyor assembly around discharge pulley 62.

As previously noted, conveyor assemblies 54, 56 and 58 are substantially identical to conveyor assembly 52 but are mounted within the housing structure in successively reversed positions so as to position the discharge pulley 78 of the conveyor assembly 52 proximate the feed pulley 76 of the conveyor assembly 54, position the discharge pulley 78 of the conveyor assembly 54 proximate the feed pulley 76 of the conveyor assembly 56, and position the discharge pulley 78 of the conveyor assembly 56 proximate the feed pulley 76 of the conveyor assembly 58.

The lower conveyor assembly 58 is slightly modified as compared to the conveyor assemblies 52, 54 and 56 so as to allow the conveyor assembly to extend to a location at the extreme forward end 28c of the housing structure for coaction with lower level conveyor 24 to facilitate the discharge of the cooled pouches 74 from the evaporative cooler.

As best seen in FIG. 5, as each pouch 74 arrives at the discharge end of a respective upper conveyor assembly and initially moves downwardly around the discharge pulley of the upper conveyor assembly, it passes between the discharge pulley of the upper conveyor assembly and the upper run of the lower conveyor assembly. As each pouch passes between the discharge pulley of the upper conveyor assembly and the upper run of the lower conveyor assembly, it is engaged at its respective upper and lower surfaces by the endless conveyor member of the upper conveyor assembly as it passes around the discharge pulley of the upper conveyor assembly and the endless conveyor member of the lower conveyor assembly as it passes beneath the discharge pulley of the upper conveyor assembly. The endless conveyor member of the lower conveyor assembly has sufficient slack, as provided for example by the bowed section 84e of the endless conveyor member between guide rollers 80 and 82, to allow it to move away from the discharge pulley of the upper conveyor assembly in response to arrival of a pouch at the juncture of the upper runs of the lower conveyor assembly and the discharge pulley of the upper conveyor assembly so as to allow the pouch to pass between the discharge pulley of the upper conveyor assembly and the upper run of the lower conveyor assembly.

The movement of the upper run of the lower conveyor assembly away from the discharge pulley of the upper conveyor assembly to accommodate a pouch therebetween is seen in dash lines in FIG. 5 and the slack take-up to provide such movement is shown by the dash line position of the endless conveyor member between guide rollers 80 and 82. The movement of the endless conveyor member of the lower conveyor assembly away from the discharge pulley of the upper conveyor assembly in response to the arrival of a pouch is further facilitated by the fact that the upper end of the angled floor 86 is spaced from the associated discharge pulley of the upper conveyor assembly so that the conveyor member of the lower conveyor assembly moves through a region between the discharge pulley of the upper conveyor assembly and the beginning of the angled floor 86 where it is unsupported. It will be seen that this unsupported region functions to allow the endless conveyor member to flex between the solid line and dash line positions of FIG. 5 in response to the arrival of a pouch at the convergence of the upper run of the lower conveyor assembly and the discharge pulley of the upper conveyor assembly. It will further be seen that the large angle divergence $\beta$ between the conveyor members 64 and 84 as they lead discharge pulley 62 facilitates the positive release of the upper side of the pouch by the conveyor member 64 as the conveyor members leave pulley 62.

It will be understood that this same manner of positive, controlled transfer of the pouches from the discharge end of the upper conveyor assembly to the feed end of the lower conveyor assembly occurs as between conveyors 50 and 52; as between conveyors 52 and 54; as between conveyors 54 and 56; and as between conveyors 56 and 58. The pouches are thus moved downwardly within the evaporative cooler between successive conveyor assemblies in a positive controlled manner with the pouches at all times moving under the positive control of the conveyor assemblies and at no time undergoing free or uncontrolled movement or fall.

As seen in FIG. 8, the pouches may be moved through the evaporative cooler in a multiple abreast arrangement such as the four abreast arrangement seen in FIG. 8, and they may be moved through the cooler in a positively controlled manner to maintain the desired lateral and longitudinal spacing between side by side pouches in a single row of pouches and between the pouches in successive rows. The invention thereby eliminates disorientation, puffing, twisting or deformation of the pouches as they move through the cooler and decreases the chances of pouch breakage or misalignment of the pouches in relation to the sides of the cooler. Additionally, because no separate external conveyor mechanism is required to effect the transfer between the upper and lower conveyor assemblies, the invention cooler is mechanically simpler than the prior art transfer arrangements. Further, the gentle squeezing of the pouches as they pass between the discharge pulley of the upper conveyor assembly and the upper run of the endless conveyor member of the lower conveyor assembly functions to stir or massage the contents of the pouches. Specifically, the material in the pouches tends to cool during the cooling process from the outside in with the result that a hot central core of material forms in each pouch with a cooler outer envelope surrounding the central core. The massaging of the pouches as they move between the upper and lower conveyor assemblies helps to stir or massage the pouch contents and move the hot inner core of the material outwardly toward the surface of the pouch to further enhance the cooling operation.

Whereas a preferred embodiment of the invention has been illustrated and described in detail, it will be apparent that various changes may be made in the disclosed embodiment without departing from the scope or spirit of the invention.

We claim:

1. A conveyor mechanism including a housing, a plurality of generally horizontal endless conveyor assemblies arranged one above the other within the housing in vertically spaced relation and each including an endless conveyor member trained over feed and discharge pulleys at the feed and discharge ends of the conveyor assembly, and means driving the upper runs of the conveyor assemblies in successively opposite longitudinal directions within the housing so that an article may be deposited on the feed end of the uppermost conveyor assembly, move in one longitudinal direction along the upper run of the uppermost conveyor assembly to the discharge end of the uppermost conveyor assembly for discharge onto the feed end of a lower conveyor assembly, thereafter move in an opposite longitudinal direction along the upper run of the lower conveyor assembly to the discharge end of the lower conveyor assembly for discharge onto the feed end of a yet lower conveyor assembly, and proceed in this manner successively along all of the conveyor assemblies until discharged from the discharge end of the lowermost conveyor assembly; characterized in that, with respect to each discharge end of an upper conveyor assembly coacting with a feed end of a lower conveyor assembly;

the feed pulley of the lower conveyor assembly is elevated with respect to the discharge pulley of the upper conveyor assembly and is positioned longitudinally beyond the discharge pulley of the upper conveyor assembly; and the upper run of the lower conveyor assembly leaving the feed pulley of the lower conveyor assembly passes downwardly at an angle in proximity to the discharge pulley of the upper conveyor assembly and thereafter trains over a portion of the circumference of the discharge pulley of the upper conveyor assembly to a location below the discharge pulley of the upper conveyor assembly so that articles leaving the discharge end of the upper conveyor assembly pass between the discharge pulley of the upper conveyor assembly and the upper run of the lower conveyor assembly and are engaged at their respective upper and lower surfaces by the endless conveyor member of the upper conveyor assembly as it passes around the discharge pulley of the upper conveyor assembly and the endless conveyor member of the lower conveyor assembly as it passes beneath the discharge pulley of the upper conveyor assembly.

2. A conveyor mechanism according to claim 1 wherein:

the highest point on the feed pulley of the lower conveyor assembly is at least as high as the center of rotation of the discharge pulley of the upper conveyor assembly.

3. A conveyor mechanism according to claim 2 wherein:

the highest point on the feed pulley of the lower conveyor assembly is higher than the center of rotation of the discharge pulley of the upper conveyor assembly.

4. A conveyor mechanism according to claim 2 wherein:

the center of rotation of the feed pulley of the lower conveyor assembly is higher than the center of rotation of the discharge pulley of the upper conveyor assembly.

5. An evaporative cooler for pouches including a housing, a plurality of generally horizontal endless conveyor assemblies arranged one above the other within the housing in vertically spaced relation and each including an endless conveyor member trained over feed and discharge pulleys at the feed and discharge ends of the conveyor assembly, and means driving the upper runs of the conveyor assemblies in successively opposite longitudinal directions within the housing so that a pouch may be deposited on the feed end of the uppermost conveyor assembly, move in one longitudinal direction along the upper run of the uppermost conveyor assembly to the discharge end of the uppermost conveyor assembly for discharge onto the feed end of a lower conveyor assembly, thereafter move in an opposite longitudinal direction along the upper run of the lower conveyor assembly to the discharge end of the lower conveyor assembly for discharge onto the feed end of a yet lower conveyor assembly, and proceed in this manner successively along all of the conveyor assemblies until discharged from the discharge end of the lowermost conveyor assembly; characterized in that, with respect to each discharge end of an upper conveyor assembly coacting with a feed end of a lower conveyor assembly;

the feed pulley of the lower conveyor assembly is elevated with respect to the discharge pulley of the upper conveyor assembly and is positioned longitudinally beyond the discharge pulley of the upper conveyor assembly; and the upper run of the lower conveyor assembly leaving the feed pulley of the lower conveyor assembly passes downwardly at an angle in proximity to the discharge pulley of the upper conveyor assembly and thereafter trains over a portion of the circumference of the discharge pulley of the upper conveyor assembly to a location below the discharge pulley of the upper conveyor assembly so that pouches leaving the discharge end of the upper conveyor assembly pass between the discharge pulley of the upper conveyor assembly and the upper run of the lower conveyor assembly and are engaged at their respective upper and lower surfaces by the endless conveyor assembly as it passes around the discharge pulley of the upper conveyor assembly and the endless conveyor member of the lower conveyor assembly as it passes beneath the discharge pulley of the upper conveyor assembly.

6. An evaporative cooler according to claim 5 wherein:

the highest point on the feed pulley of the lower conveyor assembly is at least as high as the center of rotation of the discharge pulley of the upper conveyor assembly.

7. An evaporative cooler according to claim 6 wherein:

the highest point on the feed pulley of the lower conveyor assembly is higher than the center of rotation of the discharge pulley of the upper conveyor assembly.

8. An evaporative cooler according to claim 6 wherein:

the center of rotation of the feed pulley of the lower conveyor assembly is higher than the center of rotation of the discharge pulley of the upper conveyor assembly.

9. A method of conveying articles through a treatment facility in which the articles are moved back and forth gradually downwardly within the facility by a plurality of endless conveyor assemblies arranged one above the other within the facility in vertically spaced relation and each including an endless conveyor member trained over feed and discharge pulleys at the feed and discharge ends of the conveyor assemblies so that the articles may be moved along the upper run of an upper conveyor assembly in one longitudinal direction and thereafter transferred from the discharge end of the upper conveyor assembly to the feed end of a lower conveyor assembly for movement along the upper run of the lower conveyor assembly in the opposite longitudinal direction, characterized in that;

the upper run of the lower conveyor assembly leaving the feed pulley of the lower conveyor assembly passes beneath and proximate the discharge pulley of the upper conveyor assembly and is free to move toward and away from the discharge pulley of the upper conveyor assembly;

the articles are transferred between the discharge end of the upper conveyor assembly and the feed end of the lower conveyor assembly by passing them between the upper run of the lower conveyor assembly and the discharge pulley of the upper conveyor assembly with one surface of each article engaged by the endless conveyor member of the upper conveyor assembly as it passes around the discharge pulley of the upper conveyor assembly and the other surface of the article engaged by the endless conveyor member of the lower conveyor assembly as it passes beneath the discharge pulley of the upper conveyor assembly and with the upper run of the lower conveyor assembly moving selectively toward and away from the discharge pulley of the upper conveyor assembly to accommodate pouches of varying thickness.

10. A method of cooling flat pouches in which the pouches are moved back and forth and gradually downwardly within a housing by a plurality of endless conveyor assemblies arranged one above the other within the housing in vertically spaced relation and each including an endless conveyor member trained over feed and discharge pulleys at the feed and discharge ends of the conveyor assemblies so that the pouches may be moved along the upper run of an upper conveyor assembly in one longitudinal direction and thereafter transferred from the discharge end of the upper conveyor assembly to the feed end of a lower conveyor assembly for movement along the upper run of the lower conveyor assembly in the opposite longitudinal direction, characterized in that;

the upper run of the lower conveyor assembly leaving the feed pulley of the lower conveyor assembly passes beneath and proximate the discharge pulley of the upper conveyor assembly and is free to move toward and away from the discharge pulley of the upper conveyor assembly; and the pouches are transferred between the discharge end of the upper conveyor assembly and the feed end of the lower conveyor assembly by passing them between the upper run of the lower conveyor assembly and a discharge pulley of the upper conveyor assembly with one surface of each pouch engaged by the endless conveyor member of the upper conveyor assembly as it passes around the discharge pulley of the upper conveyor assembly and the other surface of the pouch engaged by the endless conveyor member of the lower conveyor assembly as it passes beneath the discharge pulley of the upper conveyor assembly and with the upper run of the lower conveyor assembly moving selectively toward and away from the discharge pulley of the upper conveyor assembly to accommodate pouches of varying thickness.

11. A conveyor mechanism including a housing, a plurality of generally horizontal endless conveyor assemblies arranged one above the other within the housing in vertically spaced relation and each including an endless conveyor member trained over feed and discharge pulleys at the feed and discharge ends of the conveyor assembly, and means driving the upper runs of the conveyor assemblies in successively opposite longitudinal directions within the housing so that an article may be deposited on the feed end of the uppermost conveyor assembly, move in one longitudinal direction along the upper run of the uppermost conveyor assembly to the discharge end of the uppermost conveyor assembly for discharge onto the feed end of a lower conveyor assembly, thereafter move in an opposite longitudinal direction along the upper run of the lower conveyor assembly to the discharge end of the lower conveyor assembly for discharge onto the feed end of a yet lower conveyor assembly, and proceed in this manner successively along all of the conveyor assemblies until discharged from the discharge end of the lowermost conveyor assembly; characterized in that, with respect to each discharge end of an upper conveyor assembly coacting with a feed end of a lower conveyor assembly;

the feed pulley of the lower conveyor assembly is elevated with respect to the discharge pulley of the upper conveyor assembly and is positioned longitudinally beyond the discharge pulley of the upper conveyor assembly;

the upper run of the lower conveyor assembly leaving the feed pulley of the lower conveyor assembly passes downwardly at an angle in proximity to the discharge pulley of the upper conveyor assembly to a location below the discharge pulley of the upper conveyor assembly so that articles leaving the discharge end of the upper conveyor assembly pass between the discharge pulley of the upper conveyor assembly and the upper run of the lower conveyor assembly and are engaged at their respective upper and lower surfaces by the endless conveyor member of the upper conveyor assembly as it passes around the discharge pulley of the upper conveyor assembly and the endless conveyor member of the lower conveyor assembly as it passes beneath the discharge pulley of the upper conveyor assembly;

the upper run of the lower conveyor assembly passes downwardly at a relatively sharp angle as it leaves the feed pulley of the lower conveyor assembly, thereafter trains over a portion of the circumference of the discharge pulley of the upper conveyor assembly, thereafter moves downwardly at a relatively shallow angle through a shallow angle portion, and thereafter moves through a generally horizontal path to the discharge pulley of the lower conveyor assembly; and the endless conveyor member of the lower conveyor assembly has sufficient slack to allow it to move away from the discharge pulley of the upper conveyor assembly in response to arrival of an article at the juncture of the upper rung of the lower conveyor assembly and the discharge pulley of the upper conveyor assembly so as to allow the article to pass between the discharge pulley of the upper conveyor assembly and the upper run of the lower conveyor assembly.

12. A conveyor mechanism according to claim 11 wherein:

the lower run of the upper conveyor assembly as it leaves the discharge pulley of the upper conveyor assembly moves upwardly to augment the divergence of the lower run of the upper conveyor assembly and the upper run of the lower conveyor assembly as the endless conveyor members leave the discharge pulley of the upper conveyor assembly.

13. A conveyor mechanism according to claim 11 wherein:

the mechanism further includes means operative to selectively move the feed pulley of the lower conveyor assembly vertically so as to selectively adjust the vertical position of the feed pulley of the lower conveyor assembly relative to the discharge pulley of the upper conveyor assembly and thereby selectively vary the extent to which the upper run of the lower conveyor assembly trains around the lower side of the discharge pulley of the upper conveyor assembly.

14. A conveyor mechanism according to claim 11 wherein:

the housing includes support means underlying the conveyor member of the lower conveyor assembly as it moves downwardly along the relatively shallow angle portion of the upper run; and the support means begins at a location along the shallow angled portion of the upper run spaced from the discharge pulley of the upper conveyor assembly so that the conveyor member of the lower conveyor assembly moves through a region between the discharge pulley of the upper conveyor assembly and the beginning of the support member where it is unsupported whereby to facilitate the movement of the endless conveyor member of the lower conveyor assembly away from the discharge pulley of the upper conveyor assembly in response to the arrival of a pouch.

15. An evaporative cooler for pouches including a housing, a plurality of generally horizontal endless conveyor assemblies arranged one above the other within the housing in vertically spaced relation and each including an endless conveyor member trained over feed and discharge pulleys at the feed and discharge ends of the conveyor assembly, and means driving the upper runs of the conveyor assemblies in successively opposite longitudinal directions within the housing so that a pouch may be deposited on the feed end of the uppermost conveyor assembly, move in one longitudinal direction along the upper run of the uppermost conveyor assembly to the discharge end of the uppermost conveyor assembly for discharge onto the feed end of a lower conveyor assembly, thereafter move in an opposite longitudinal direction along the upper run of the lower conveyor assembly to the discharge end of the lower conveyor assembly for discharge onto the feed end of a yet lower conveyor assembly, and proceed in this manner successively along all of the conveyor assemblies until discharged from the discharge end of the lowermost conveyor assembly; characterized in that, with respect to each discharge end of an upper conveyor assembly coacting with a feed end of a lower conveyor assembly;

the feed pulley of the lower conveyor assembly is elevated with respect to the discharge pulley of the upper conveyor assembly and is positioned longitudinally beyond the discharge pulley of the upper conveyor assembly;

the upper run of the lower conveyor assembly leaving the feed pulley of the lower conveyor assembly passes downwardly at an angle in proximity to the discharge pulley of the upper conveyor assembly to a location below the discharge pulley of the upper conveyor assembly so that pouches leaving the discharge end of the upper conveyor assembly pass between the discharge pulley of the upper conveyor assembly and the upper run of the lower conveyor assembly and are engaged at their respective upper and lower surfaces by the endless conveyor member of the upper conveyor assembly as it passes around the discharge pulley of the upper conveyor assembly and the endless conveyor member of the lower conveyor assembly as it passes beneath the discharge pulley of the upper conveyor assembly;

the upper run of the lower conveyor assembly passes downwardly at a relatively sharp angle as it leaves the feed pulley of the lower conveyor assembly, thereafter trains over a portion of the circumference of the discharge pulley of the upper conveyor assembly, thereafter moves downwardly at a relatively shallow angle through a shallow angle portion, and thereafter moves through a generally horizontal path to the discharge pulley of the lower conveyor assembly; and the endless conveyor member of the lower conveyor assembly has sufficient slack to allow it to move away from the discharge pulley of the upper conveyor assembly in response to arrival of a pouch at the juncture of the upper rung of the lower conveyor assembly and the discharge pulley of the upper conveyor assembly so as to allow the pouch to pass between the discharge pulley of the upper conveyor assembly and the upper rung of the lower conveyor assembly.

16. An evaporative cooler according to claim 15 wherein:

the lower run of the upper conveyor assembly as it leaves the discharge pulley of the upper conveyor assembly moves upwardly to augment the divergence of the lower run of the upper conveyor assembly and the upper run of the lower conveyor assembly as the endless conveyor members leave the discharge pulley of the upper conveyor assembly.

17. An evaporative cooler according to claim 15 wherein:

the cooler further includes means operative to selectively move the feed pulley of the lower conveyor assembly vertically so as to selectively adjust the vertical position of the feed pulley of the lower conveyor assembly relative to the discharge pulley of the upper conveyor assembly and thereby selectively vary the extent to which the upper run of the lower conveyor assembly trains around the lower side of the discharge pulley of the upper conveyor assembly.

18. An evaporative cooler according to claim 15 wherein:

the housing includes support means underlying the conveyor member of the lower conveyor assembly as it moves downwardly along the relatively shallow angle portion of the upper run; and the support means begins at a location along the shallow angle portion of the upper run spaced from the discharge pulley of the upper conveyor assembly so that the conveyor member of the lower conveyor assembly moves through a region between the discharge pulley of the upper conveyor assembly and the beginning of the support member where it is unsupported whereby to facilitate the movement of the endless conveyor member of the lower conveyor assembly away from the discharge pulley of the upper conveyor assembly in response to the arrival of a pouch.

19. A method of conveying articles through a treatment facility in which the articles are moved back and forth gradually downwardly within the facility by a plurality of endless conveyor assemblies arranged one above the other within the facility in vertically spaced relation and each including an endless conveyor member trained over feed and discharge pulleys at the feed and discharge ends of the conveyor assemblies so that the articles may be moved along the upper run of an upper conveyor assembly in one longitudinal direction and thereafter transferred from the discharge end of the upper conveyor assembly to the feed end of a lower conveyor assembly for movement along the upper run of the lower conveyor assembly in the opposite longitudinal direction, characterized in that;

the articles are transferred between the discharge end of the upper conveyor assembly and the feed end of the lower conveyor assembly by passing them between the upper run of the lower conveyor assembly and the discharge pulley of the upper conveyor assembly with one surface of each article engaged by the endless conveyor member of the upper conveyor assembly as it passes around the discharge pulley of the upper conveyor assembly and the other surface of the article engaged by the endless conveyor member of the lower conveyor assembly as it passes beneath the discharge pulley of the upper conveyor assembly; and the upper run of the lower conveyor assembly leaving the feed pulley of the lower conveyor assembly is trained around a portion of the circumference of the discharge pulley of the upper conveyor assembly so that it may coact with the discharge pulley over the circumferential portion of the discharge pulley to engage the articles therebetween.

20. A method of conveying articles through a treatment facility in which the articles are moved back and forth gradually downwardly within the facility by a plurality of endless conveyor assemblies arranged one above the other within the facility in vertically spaced relation and each including an endless conveyor member trained over feed and discharge pulleys at the feed and discharge ends of the conveyor assemblies so that the articles may be moved along the upper run of an upper conveyor assembly in one longitudinal direction and thereafter transferred from the discharge end of the upper conveyor assembly to the feed end of a lower conveyor assembly for movement along the upper run of the lower conveyor assembly in the opposite longitudinal direction, characterized in that;

the articles are transferred between the discharge end of the upper conveyor assembly and the feed end of the lower conveyor assembly by passing them between the upper run of the lower conveyor assembly and the discharge pulley of the upper conveyor assembly with one surface of each article engaged by the endless conveyor member of the upper conveyor assembly as it passes around the discharge pulley of the upper conveyor assembly and the other surface of the article engaged by the endless conveyor member of the lower conveyor assembly as it passes beneath the discharge pulley of the upper conveyor assembly;

the upper run of the lower conveyor assembly is positioned adjacent the discharge pulley of the upper conveyor assembly; and slack is provided in the endless conveyor member of the lower conveyor assembly so that it may move away from the discharge pulley of the upper conveyor assembly in response to the arrival of an article at the convergence of the upper run of the lower conveyor assembly and the discharge pulley of the upper conveyor assembly.

21. A method of cooling flat pouches in which the pouches are moved back and forth and gradually downwardly within a housing by a plurality of endless conveyor assemblies arranged one above the other within the housing in vertically spaced relation and each including an endless conveyor member trained over feed and discharge pulleys at the feed and discharge ends of the conveyor assemblies so that the pouches may be moved along the upper run of an upper conveyor assembly in one longitudinal direction and thereafter transferred from the discharge end of the upper conveyor assembly to the feed end of a lower conveyor assembly for movement along the upper run of the lower conveyor assembly in the opposite longitudinal direction, characterized in that;

the pouches are transferred between the discharge end of the upper conveyor assembly and the feed end of the lower conveyor assembly by passing them between the upper run of the lower conveyor assembly and the discharge pulley of the upper conveyor assembly with one surface of each pouch engaged by the endless conveyor member of the upper conveyor assembly as it passes around the discharge pulley of the upper conveyor assembly and the other surface of the pouch engaged by the endless conveyor member of the lower conveyor assembly as it passes beneath the discharge pulley of the upper conveyor assembly; and the upper run of the lower conveyor assembly leaving the feed pulley of the lower conveyor assembly is trained around a portion of the circumference of the discharge pulley of the upper conveyor assembly so that it may coact with the discharge pulley over the circumferential portion of the discharge pulley to engage a pouch therebetween.

22. A method of cooling flat pouches in which the pouches are moved back and forth and gradually downwardly within a housing by a plurality of endless conveyor assemblies arranged one above the other within the housing in vertically spaced relation and each including an endless conveyor member trained over feed and discharge pulleys at the feed and discharge ends of the conveyor assemblies so that the pouches may be moved along the upper run of an upper conveyor assembly in one longitudinal direction and thereafter transferred from the discharge end of the upper conveyor assembly to the feed end of a lower conveyor assembly for movement along the upper run of the lower conveyor assembly in the opposite longitudinal direction, characterized in that;

the pouches are transferred between the discharge end of the upper conveyor assembly and the feed end of the lower conveyor assembly by passing them between the upper run of the lower conveyor assembly and a discharge pulley of the upper conveyor assembly with one surface of each pouch engaged by the endless conveyor member of the upper conveyor assembly as it passes around the discharge pulley of the upper conveyor assembly and the other surface of the pouch engaged by the endless conveyor member of the lower conveyor assembly as it passes beneath the discharge pulley of the upper conveyor assembly;

the upper run of the lower conveyor assembly is positioned adjacent the discharge pulley of the upper conveyor assembly; and slack is provided in the upper run of the lower conveyor assembly so that it may move away from the discharge pulley of the upper conveyor assembly in response to arrival of a pouch at the convergence of the upper run of the lower conveyor assembly and the discharge pulley of the upper conveyor assembly.

* * * * *